United States Patent
King

[15] 3,672,085
[45] June 27, 1972

[54] AUTOMATIC HOOK SETTING DEVICE

[72] Inventor: George W. King, P.O. Box 144, Gower, Mo. 64454

[22] Filed: May 13, 1970

[21] Appl. No.: 36,786

[52] U.S. Cl. ................................................43/15, 43/21.2
[51] Int. Cl. ......................................................A01k 97/00
[58] Field of Search ............................................43/15, 21.2

[56] References Cited

UNITED STATES PATENTS

| | | | |
|---|---|---|---|
| 1,957,853 | 5/1934 | Sibley | 43/15 |
| 2,804,277 | 8/1957 | Kinder | 43/21.2 X |
| 3,444,643 | 5/1969 | Dobbs | 43/21.2 X |
| 2,899,769 | 8/1959 | Niles | 43/21.2 |
| 2,642,690 | 6/1953 | Soenksen | 43/15 |
| 2,964,868 | 12/1960 | Bennett | 43/15 |

Primary Examiner—Samuel Koren
Assistant Examiner—Daniel J. Leach
Attorney—Fishburn, Gold and Litman

[57] ABSTRACT

An automatic hook setting device for an unattended fishing pole comprises a vertically extending standard having one end adapted to be firmly anchored in a fixed position and an elongated transversely extending bar fixedly mounted on an upper end of the standard. An elongated rod is pivotally mounted on the bar intermediate its ends and has a pole cradle adjacent one end and a holding member adjacent the other end thereof for holding a fishing pole handle. A releasable catch member is pivotally mounted on the rod for engaging the bar and has a trigger portion positioned to have a fishing line looped therearound. Spring means is connected to the rod to move same and the fishing pole thereon to set a fish hook when a fish pulls on the line to release the catch member.

1 Claim, 6 Drawing Figures

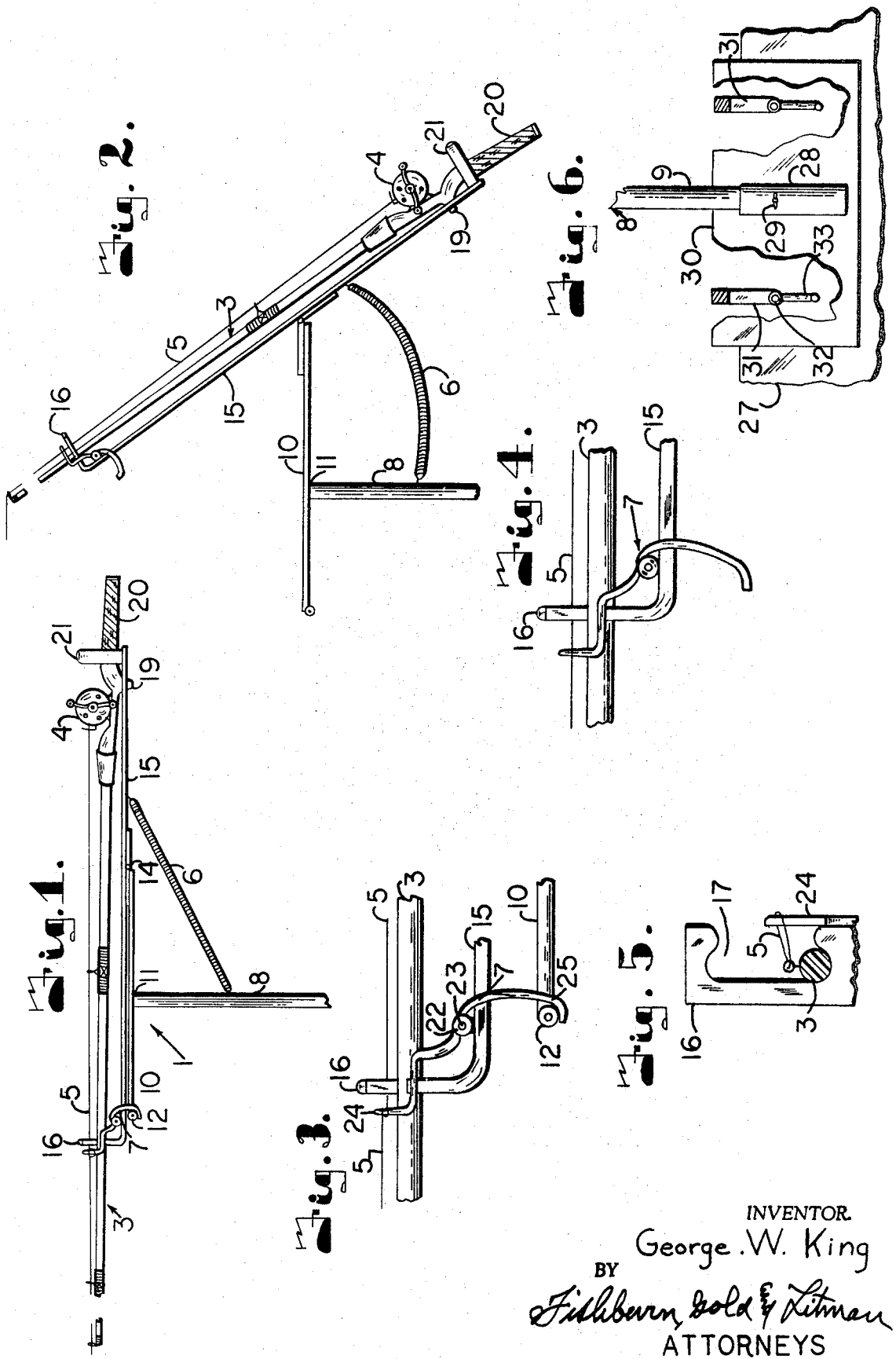

AUTOMATIC HOOK SETTING DEVICE

The present invention relates to rod and reel fishing and more particularly to such fishing employing an automatic hook setting device movable to make a strike when a fish takes a hook on a line, thereby releasing a catch member to effect a momentary reverse movement of the line and hook.

Although a number of so-called automatic bite controlled fish catchers have been patented by others, actual adoption and wide-spread use thereof has apparently not taken place. It is believed that commercial acceptance of an invention in this category depends largely on providing a sensitive latching and releasing mechanism, therefore, a significant objective of the instant invention is to devise and successfully use a simple and effective catch mechanism which, once it has been set in a manner to "spring the trap," the several components are effectively held in position until a fish takes the hook on the line.

The principal objects of the present invention are: to provide a fishing pole supporting apparatus having a sensitive catch member so constructed that the instant there is a pull on the line, the fishing pole will be given a sudden upward jerking motion to such an extent as to successfully make the strike without any attention on the part of the fisherman, other than to initially set the apparatus; to provide such a supporting apparatus wherein the fishing pole may be instantly disengaged therefrom without the necessity of unfastening any catches or holders and without any loss of time, so that the playing of the fish, after the strike is once made, may be carried on in the usual and desired manner; to provide such a supporting apparatus adapted for mounting either in a bank adjacent a stream or body of water, or on a boat; to provide such a support apparatus having a sensitive and highly effective releaseable catch member to effect a momentary reverse movement of the line and a hook thereon responsive to a pull on a fishing line; and to provide such a supporting apparatus which is economical to manufacture, durable in construction, sensitive and effective in operation, and particularly well adapted for the proposed use.

Other objects and advantages of this invention will become apparent from the following description taken in connection with the accompanying drawings wherein are set forth by way of illustration and example, certain embodiments of this invention.

FIG. 1 is a side elevational view of an automatic hook setting device embodying features of the present invention and shown in a cocked or prepared position.

FIG. 2 is a side elevational view of the automatic hook setting device shown in position after being tripped.

FIG. 3 is an enlarged fragmentary side elevational view of a releaseable catch member shown in a cocked or engaged position.

FIG. 4 is an enlarged fragmentary side elevational view of the releaseable catch member shown in a tripped position.

FIG. 5 is an enlarged fragmentary front elevational view of the releaseable catch member.

FIG. 6 is a side elevational view of a support structure for mounting the automatic hook setting device on a boat and having portions broken away to better illustrate the component parts of the support structure.

Referring more in detail to the drawings:

The reference numeral 1 generally designates an automatic hook setting device adapted to be mounted in a bank along a stream or adjacent a body of water (not shown). The automatic hook setting device 1 includes a supporting apparatus for a fishing pole 3 having a suitable reel 4 and line 5 mounted thereon. The supporting apparatus is pivotally mounted on a stationary portion of the automatic hook setting device 1 and a resilient member 6 is operative to move the supporting apparatus to set a hook (not shown) when the supporting apparatus is released by a catch member 7 in response to a pull on the line 5, as by a fish taking bait on the hook.

In the illustrated structure, the stationary portion of the device 1 includes a vertically extending standard 8 having a lower end adapted to be firmly anchored in a fixed position, such as in the bank. An elongated transversely extending bar or plate 10 is fixedly mounted on an upper end 11 of the standard 8. The bar or plate 10 has a finger 12 extending transversely from one end thereof and the finger 12 is adapted to be engaged by the catch member 7, as later described. A suitable hinge 14 has one leaf thereof fixedly mounted on the other end of the bar or plate 10 and the other leaf connected to the pole supporting apparatus whereby the pole supporting apparatus is pivotally mounted on the bar or plate 10.

The pole supporting apparatus includes an elongated rod or plate 15 having the other leaf of the hinge 14 connected thereto intermediate its ends. The rod or plate 15 has an upturned end 16 to form a pole cradle for supporting and engaging an intermediate portion of the fishing pole 3. The upturned end 16 of the rod or plate 15 has a recess 17 in one side edge thereof and the recess 17 has a downwardly extending portion to support the pole 3. The line 5 extends through the recess and around a trigger portion of the catch member 7 to move same, to release the catch member 7, as later described.

An opposite end of the rod or plate 15 has a recess therein shaped to receive a laterally or transversely extending portion 19 of a handle 20 of the fishing pole 3. A gripping member 21 is mounted on the rod 15 and spaced from the recess therein and the gripping member 21 is shaped to receive and grippingly engage a handle portion 20 of the fishing pole 3. The recess and the gripping member 21 cooperate to maintain the fishing pole 3 on the support structure when a fish takes bait on a hook (not shown).

The catch member 7 holds the supporting apparatus in a cocked or prepared position and releases same in response to a pull on the line 5, as by a fish taking a hook and bait thereon. In the illustrated structure, the catch member 7 has an intermediate portion 22 sleeved on a shaft 23 mounted on the rod 15 adjacent the upturned end 16. The catch member 7 has a trigger portion 24 extending from the intermediate portion 22 and the trigger portion 24 extends adjacent the pole cradle and is positioned to have a fishing line 5 looped therearound.

The catch member 7 has a keeper portion 25 extending from the intermediate portion 22 and the keeper portion 25 is shaped to engage the finger 12 on the bar or plate 10. The keeper portion 25 maintains the pole supporting apparatus in a cocked or prepared position until a pull on the line 5 overcomes the frictional resistance between the keeper portion 25 and the finger 12.

In using the device constructed as described and shown, it is noted that when the keeper portion 25 of the catch member 7 is disengaged from the finger 12, the resilient member 6 will move the pole supporting apparatus to the tripped position, as shown in FIG. 2, to thereby set the hook in the mouth of a fish taking bait thereon. The resilient member 6 is illustrated as a helical or coil spring having one end secured to a lower portion of the standard 8 and the other end secured to or connected to the rod 15 at a point between the hinge 14 and recess for receiving the portion 19 of the handle 20 whereby the resilient member 6 is operative to move the supporting apparatus and the fishing rod or pole 3 thereon to set a fish hook when a fish pulls on the line 5 to release the catch member 7.

It is desirable to mount the automatic hook setting device 1 on a boat 27 whereby the device 1 may be maneuvered into or adjacent desirable areas within a body of water which are inaccessible from a bank or shoreline.

In the illustrated structure, a vertically extending socket member 28 is adapted to receive the lower end 9 of the standard 8. The socket member 28 has means thereon for holding the standard 8 therein and for removably mounting the socket member 28 and standard 8 on the boat 27. A fastening member 29 is mounted in the socket member 28 and is adapted to engage the standard 8 adjacent the lower end 9 thereof to hold same in a desired vertical position. A generally vertically extending base member 30 is engageable with an exterior surface of the boat 27 and has the socket member 28 suitably mounted thereon, as by welding. At least one and preferably a pair of arms 31 are suitably mounted on an upper edge portion of the base member 30, as by welding, and extend laterally therefrom. Each arm 31 has a depending portion having means mounted thereon for effecting clamping engagement between the base member 30 and the side of the boat 27. In the illustrated structure, a threaded member 32 extends through a threaded aperture in the respective arm 31 and a handle member 33 is mounted on the threaded member 32 and is adapted to be gripped to rotate the threaded member 32 to move an abutment portion on the threaded member 32 into engagement with an interior surface of a side of the boat 27 and the base member 30 is moved into engagement with an exterior surface of a side of the boat 27.

It is to be understood that while I have illustrated and described one form of my invention, it is not to be limited to the specific form or arrangement of parts herein described and shown.

What I claim and desire to secure by Letters Patent is:

1. An automatic hook setting device for an unattended fishing pole comprising:
   a. a vertically extending standard having one end adapted to be firmly anchored in a fixed position;
   b. an elongated transversely extending bar having an intermediate portion thereof fixedly mounted on an upper end of said standard and having a finger extending transversely from one end thereof;
   c. an elongated rod hingedly mounted on the other end of said bar, said other end of said bar being transversely spaced from said standard and said rod being hingedly mounted intermediate its ends, a pole cradle mounted adjacent one end of said rod, said pole cradle being a vertically extending member having a recess in a side edge thereof, said recess being positioned to permit a portion of a fishing line to extend outwardly therethrough, said recess having a downwardly extending portion forming a socket portion to support a fishing pole therein;
   d. means adjacent the other end of said elongated rod for fixedly holding a fishing pole handle and comprising a recess in said elongated rod shaped to receive a portion of the handle therein and a gripping member positioned and shaped to receive and grippingly engage a portion of the handle of the fishing pole;
   e. a releaseable catch member having an intermediate portion pivotally mounted on said rod adjacent to said vertically extending member and in proximity to said finger on said bar and including a keeper portion for engaging said finger, said catch member having a trigger portion extending forwardly of said vertically extending member and positioned to have the fishing line extending through the recess in the vertically extending member defining said pole cradle looped therearound; and
   f. resilient means connected to said rod and said standard to move said rod and the fishing pole thereon to set a fish hook in response to a pull on the fishing line upon release of said catch member.

\* \* \* \* \*